Figure 1:
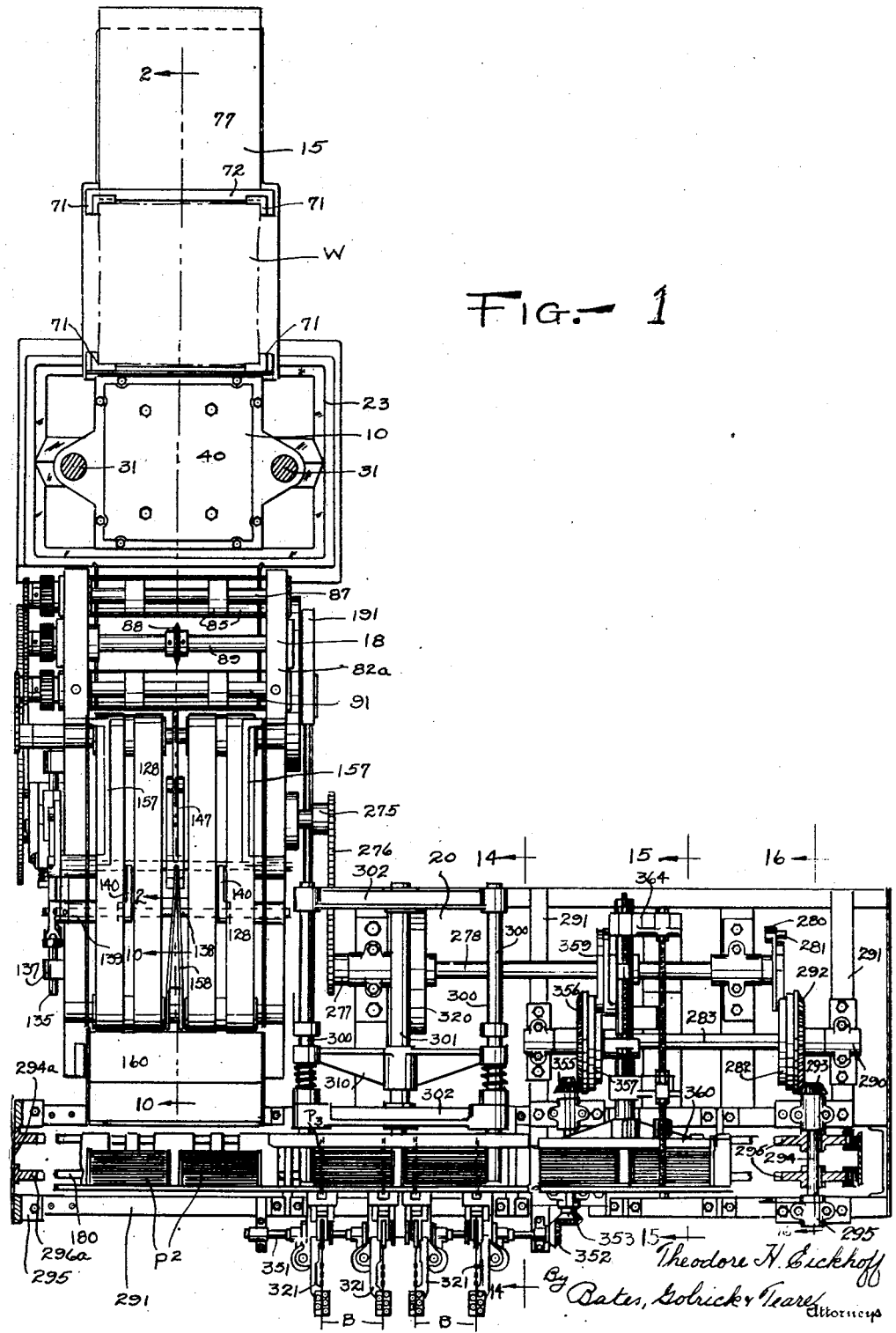

Jan. 12, 1932.  T. H. EICKHOFF  1,841,017
SLAB FORMING AND BUNDLING APPARATUS
Filed Jan. 12, 1929   12 Sheets-Sheet 2
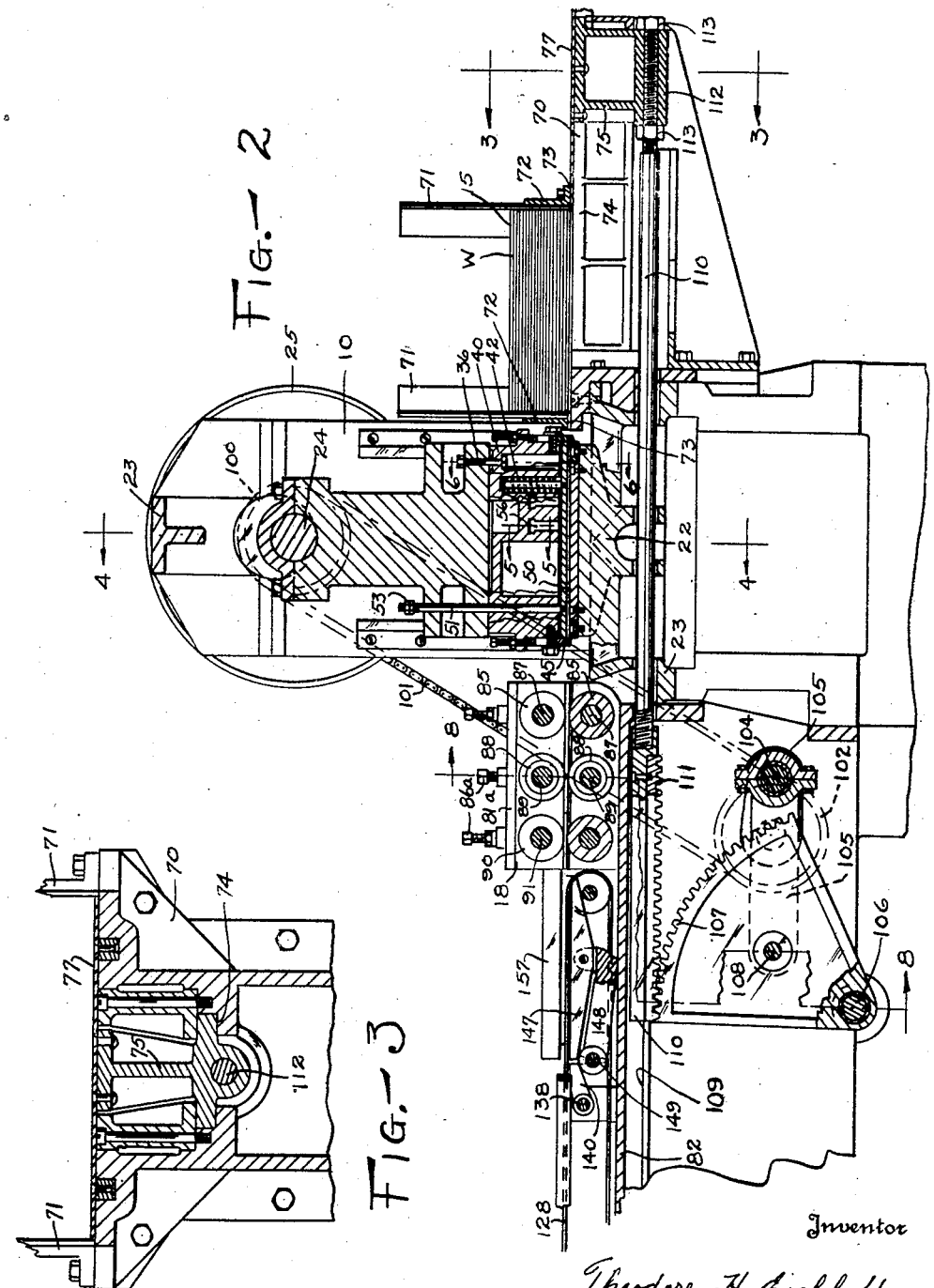
Inventor
Theodore H. Eickhoff
By Bates, Golrick & Teare
Attorneys

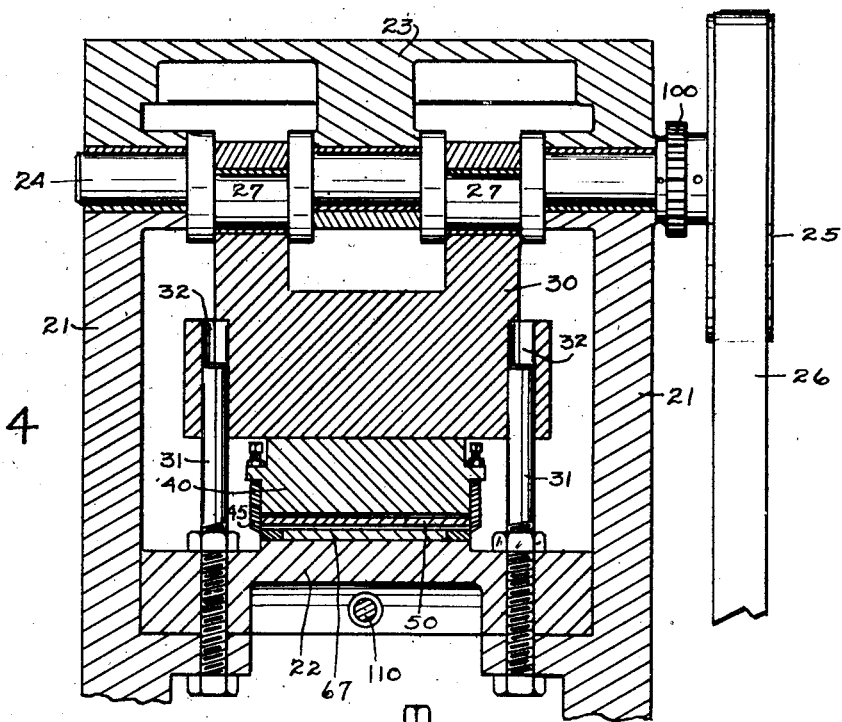
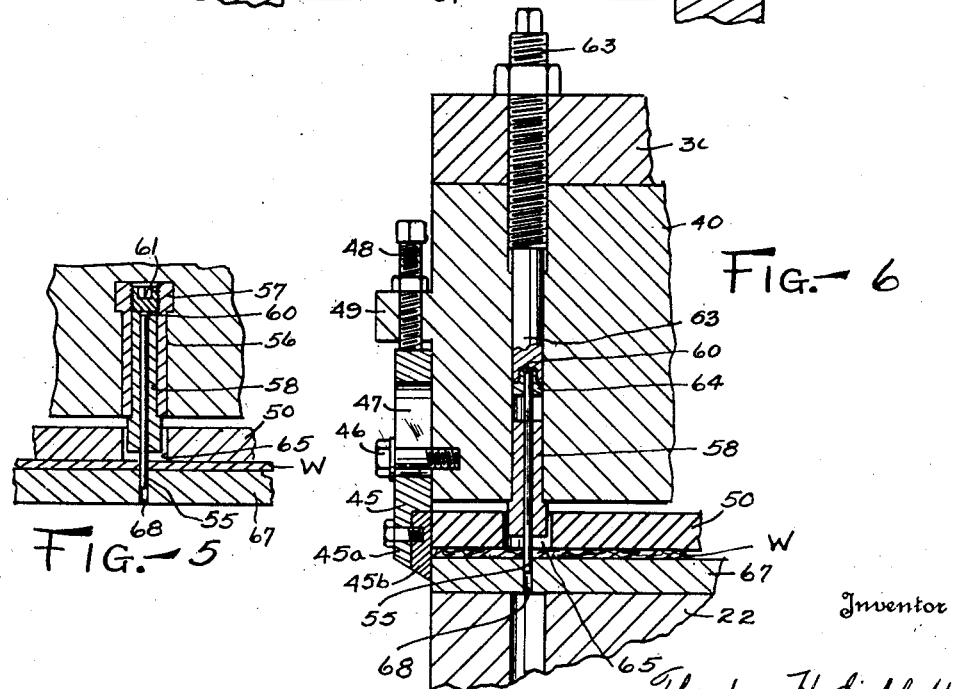

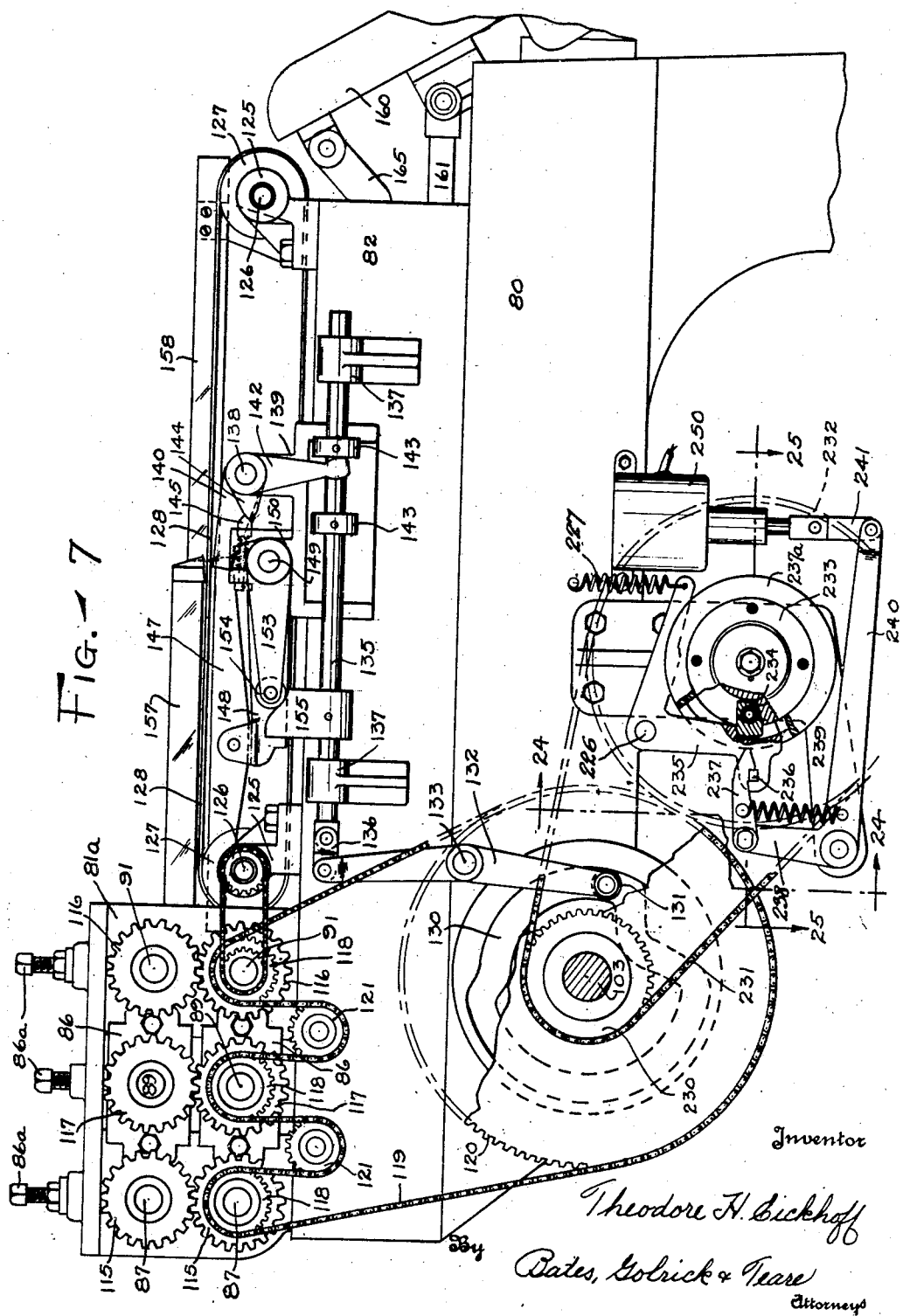

Jan. 12, 1932.  T. H. EICKHOFF  1,841,017
SLAB FORMING AND BUNDLING APPARATUS
Filed Jan. 12, 1929   12 Sheets-Sheet 5
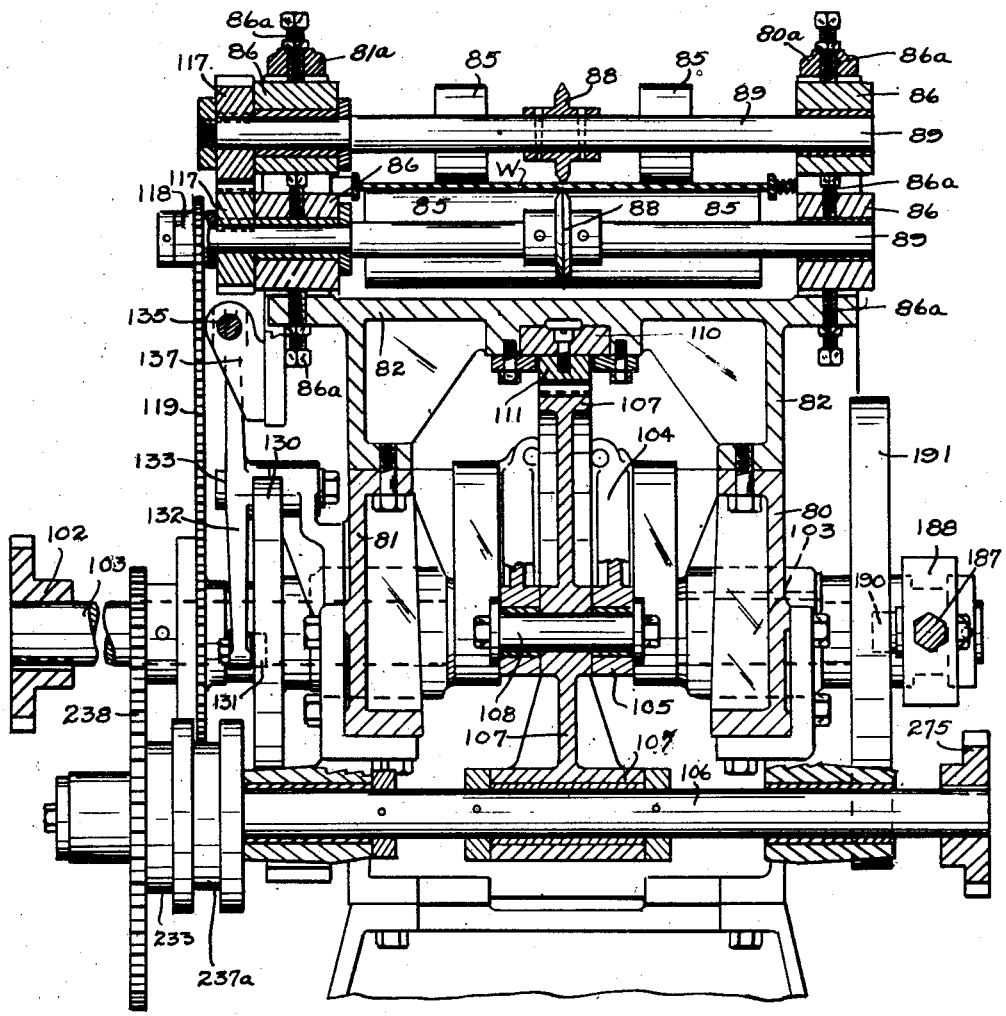
Fig.—8
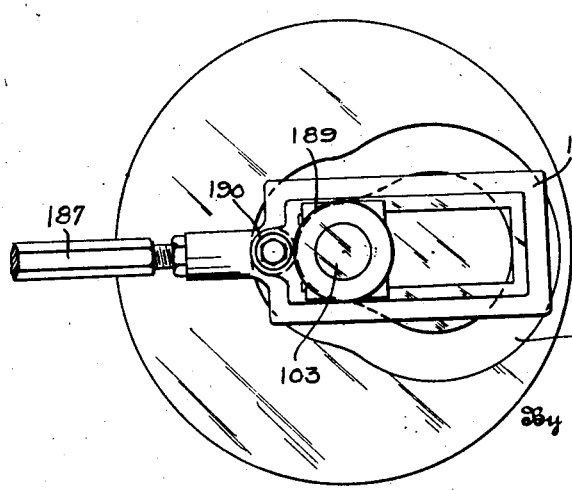
Fig.—9
Inventor
Theodore H. Eickhoff
By Bates, Gobrick & Teare
Attorneys Jan. 12, 1932.  T. H. EICKHOFF  1,841,017
SLAB FORMING AND BUNDLING APPARATUS
Filed Jan. 12, 1929   12 Sheets-Sheet 6

Inventor
Theodore H. Eickhoff
By Bates, Golrick & Teare
Attorneys

Jan. 12, 1932.    T. H. EICKHOFF    1,841,017
SLAB FORMING AND BUNDLING APPARATUS
Filed Jan. 12, 1929    12 Sheets-Sheet 7
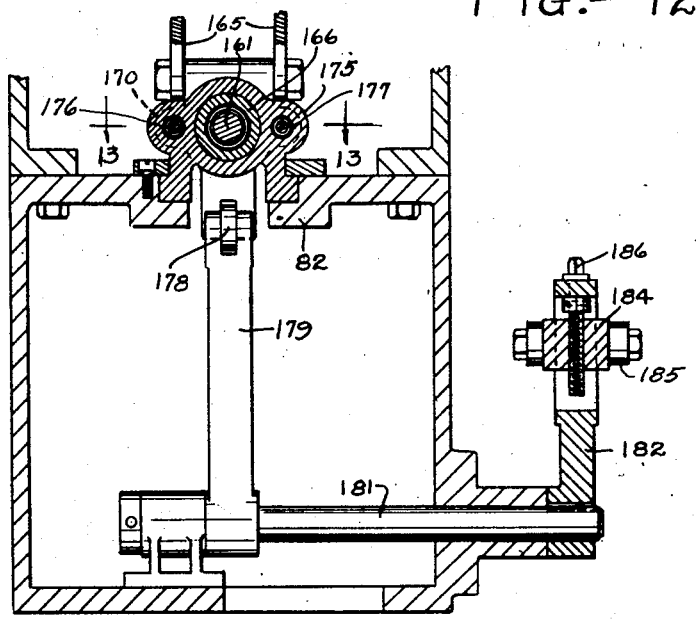
FIG.-12
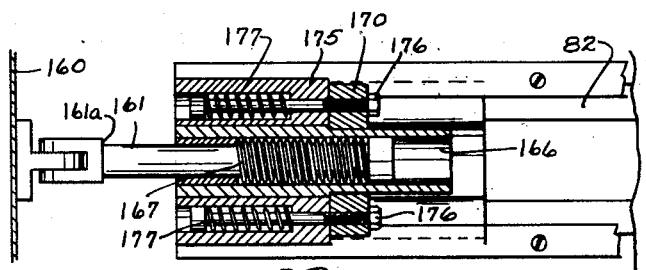
FIG.-13
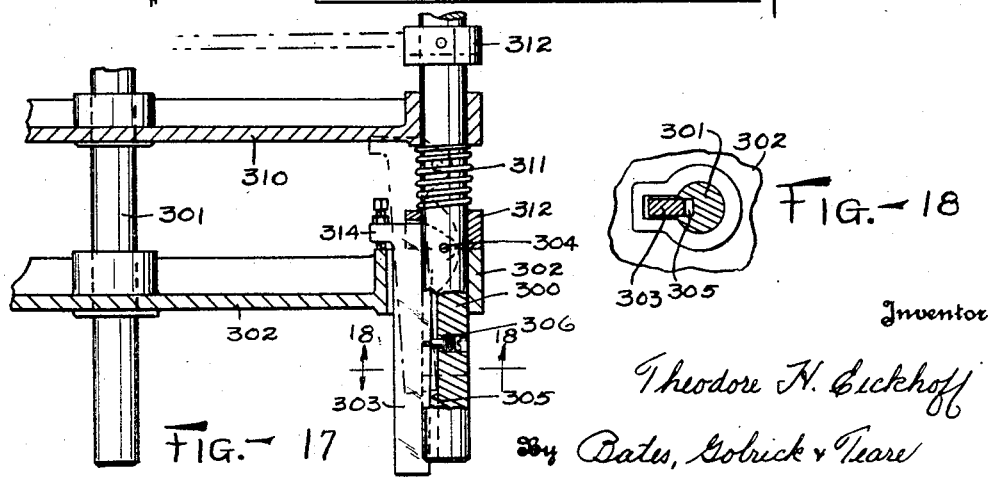
FIG.-17
FIG.-18
Inventor
Theodore H. Eickhoff
By Bates, Gobrick & Teare
Attorneys Jan. 12, 1932.   T. H. EICKHOFF   1,841,017
SLAB FORMING AND BUNDLING APPARATUS
Filed Jan. 12, 1929    12 Sheets-Sheet 9
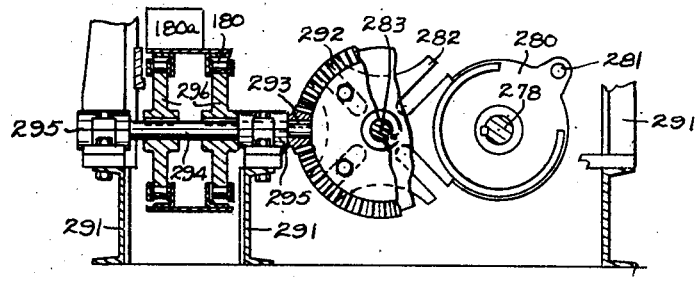
FIG.-16
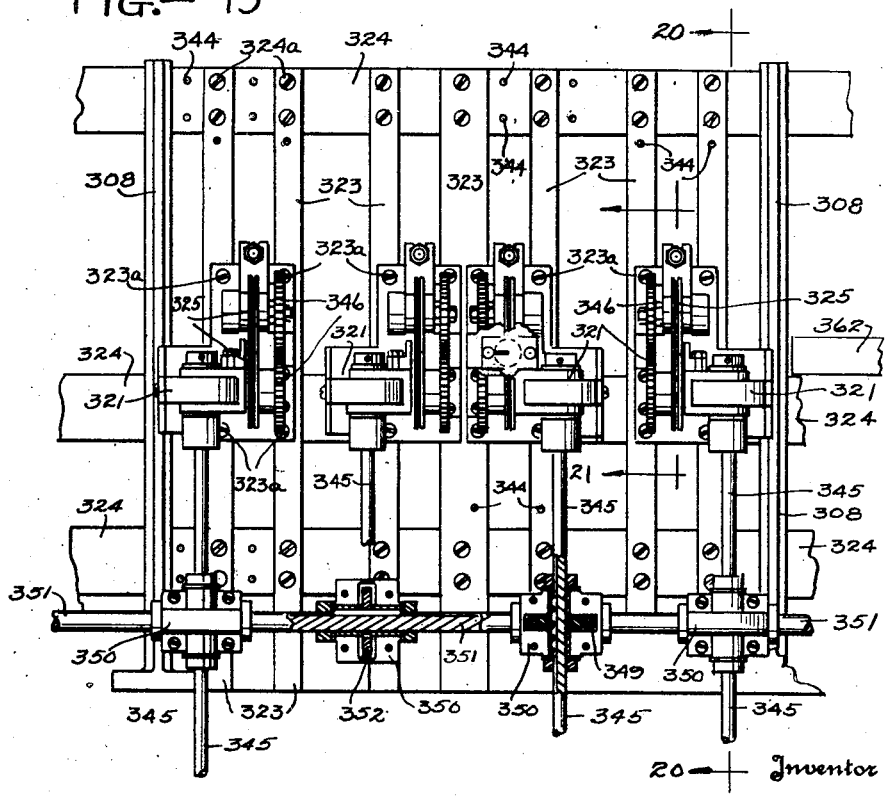

Jan. 12, 1932. T. H. EICKHOFF 1,841,017
SLAB FORMING AND BUNDLING APPARATUS
Filed Jan. 12, 1929 12 Sheets-Sheet 10
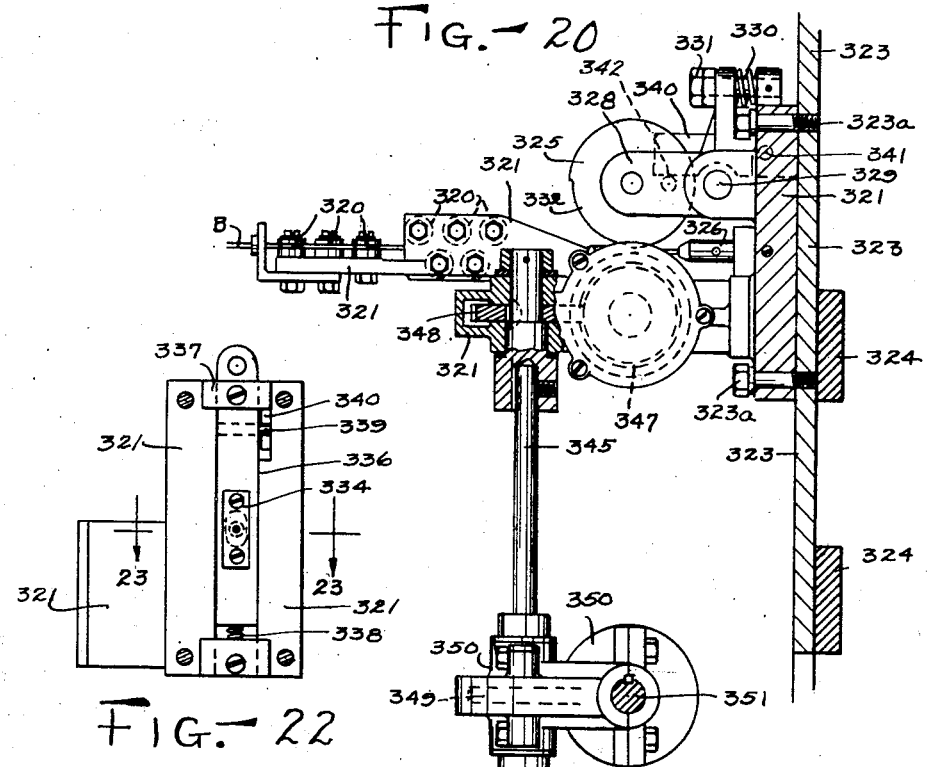
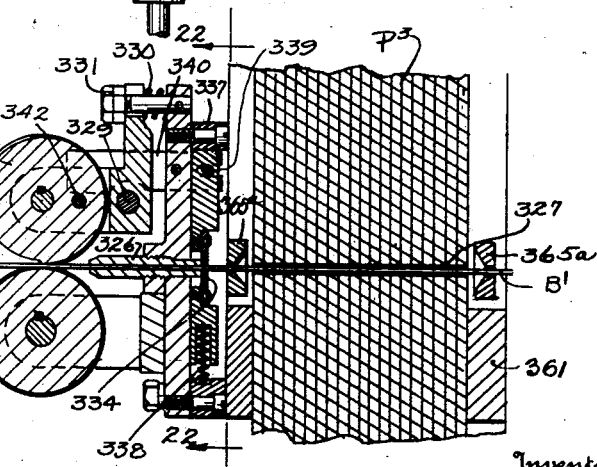
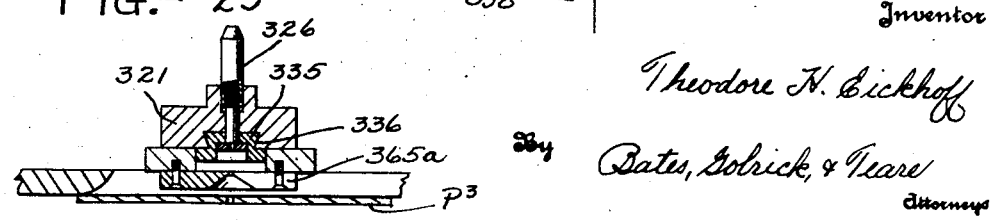
Inventor
Theodore H. Eickhoff
By Bates, Golrick, & Teare
Attorneys

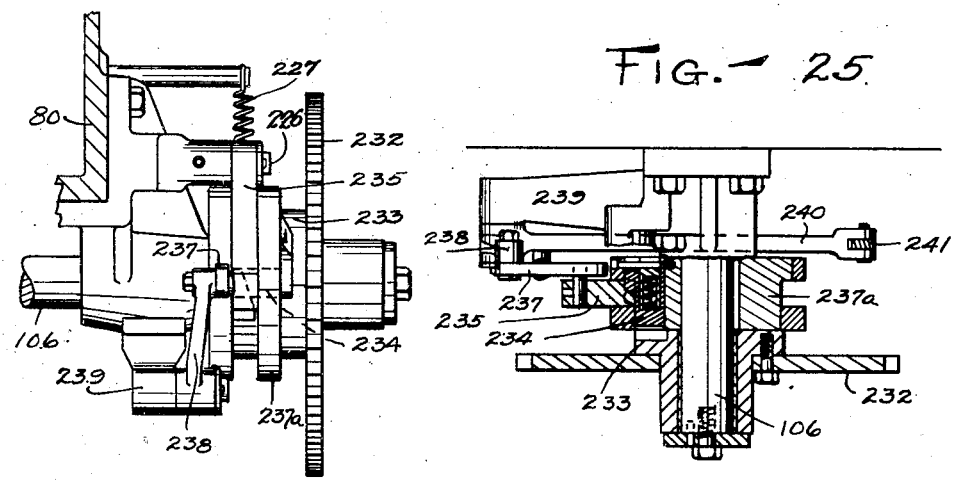
FIG.- 25.
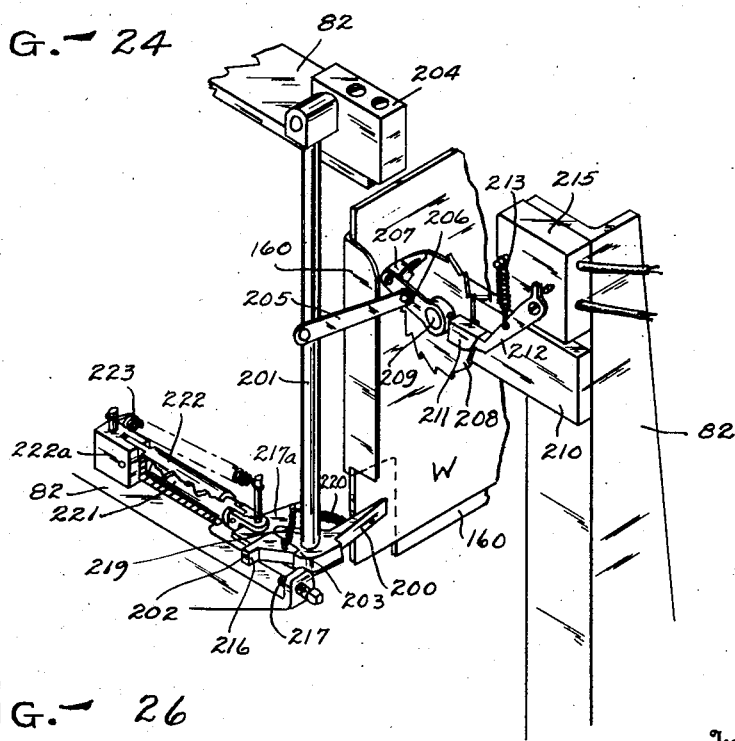
FIG.- 24
FIG.- 26

Jan. 12, 1932.  T. H. EICKHOFF  1,841,017
SLAB FORMING AND BUNDLING APPARATUS
Filed Jan. 12, 1929   12 Sheets-Sheet 12

FIG.-33

Inventor
Theodore H. Eickhoff
By Bates, Golrick & Teare
Attorneys

Patented Jan. 12, 1932

1,841,017

UNITED STATES PATENT OFFICE

THEODORE H. EICKHOFF, OF CLEVELAND HEIGHTS, OHIO, ASSIGNOR TO PHILIP CAREY MFG. COMPANY, OF LOCKLAND, OHIO

SLAB FORMING AND BUNDLING APPARATUS

Application filed January 12, 1929. Serial No. 332,146.

This invention relates to apparatus for cutting, stacking and bundling slab materials such as comprise composition shingles and the like, and has for one of its objects the provision of an apparatus which will effectively cut, perforate and trim the composition shingles to required dimensions.

One of the objects of the present invention is to provide mechanism which will feed slabs of material to a cutting and perforating mechanism which is adapted to size, perforate and divide the slabs into a plurality of finished units. Another object is to provide a stacking mechanism which will stack a predetermined number of the units with precision and without marring or mutilating the products. Another object is to provide an apparatus for binding the stacked units in bundle formations and in such manner as to avoid mutilation of the units. A further object of my invention is to provide an apparatus in cooperating relation to the sheet cutting and perforating mechanism that will effectively bind the product together in bundle formation by utilizing the perforations previously made in the product. Another object is to provide an apparatus which will divide the trimmed sheet material into a plurality of finished units or products without causing loss of material or necessitating the use of a complicated trimming and perforating press.

One of the features of my invention is that I provide an apparatus which is continuous in operation and is operated from a single source of power to effect trimming, perforating and dividing of the sheets into the finished product and thereafter count, stack and bind the product into bundles without necessitating any manual handling of the product or sheets. Further objects will become apparent from the following description of my invention which pertains to the accompanying drawings. The essential characteristics are summarized in the claims.

Figure 10:
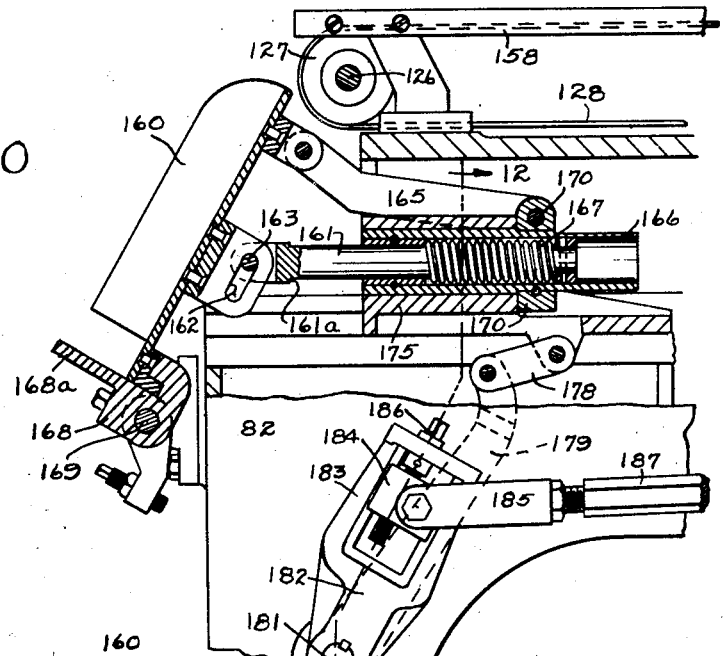
Figure 11:
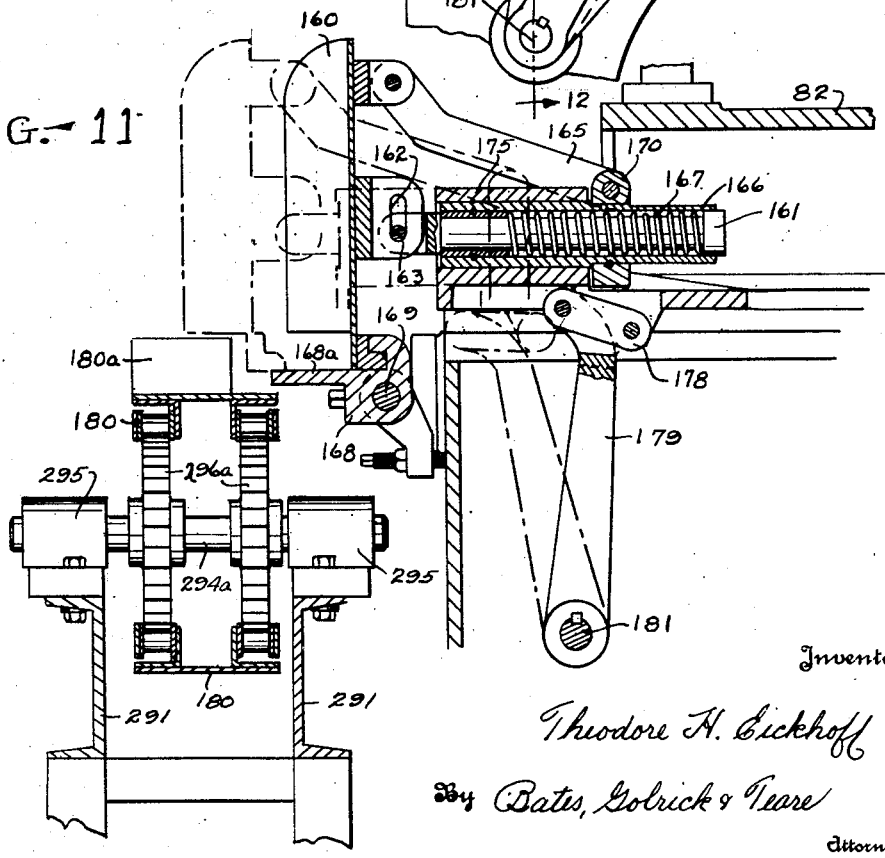
Figure 14:
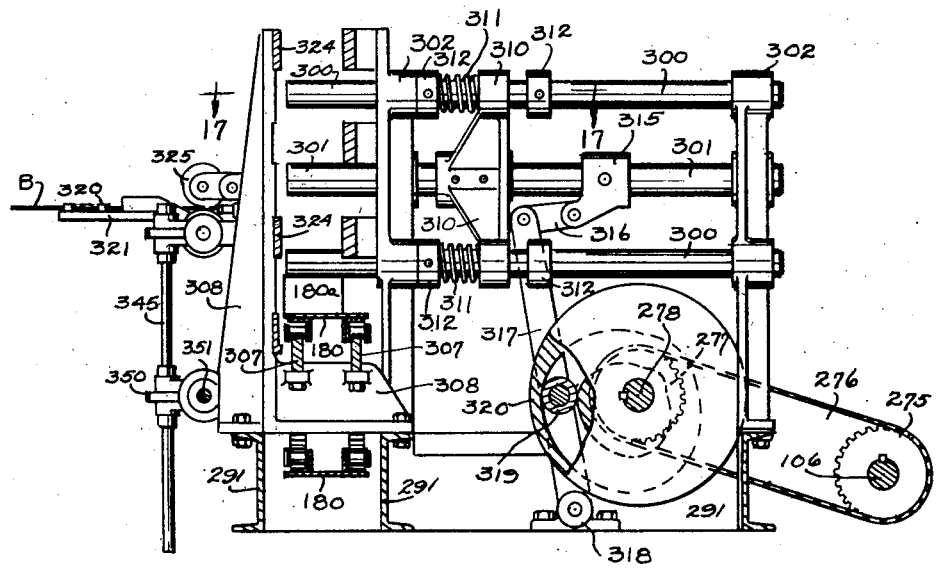
Figure 15:
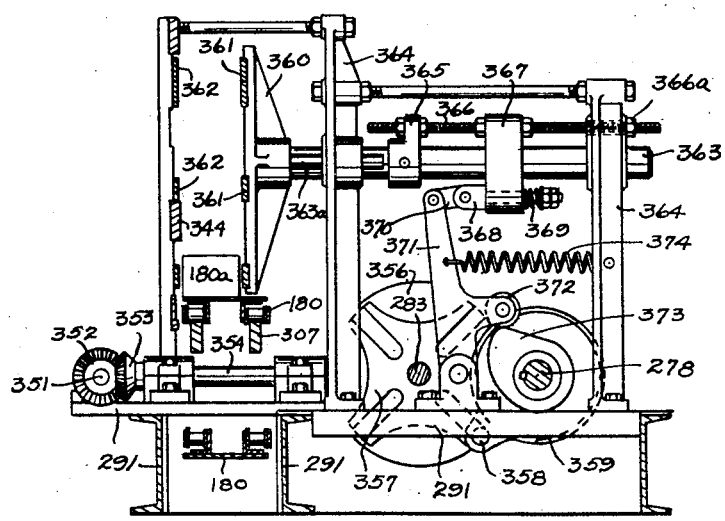
Figure 36:
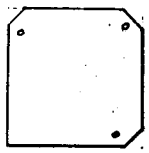
Figure 37:
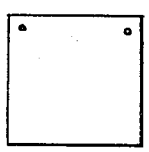
Figure 29:
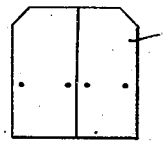
Figure 30:
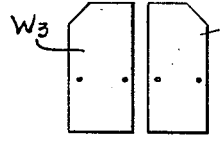
Figure 31:
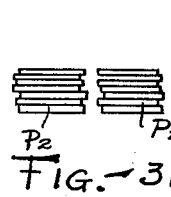
Figure 32:
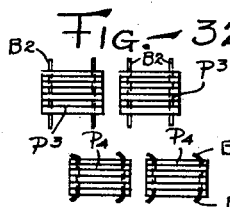
Figure 35:

In the drawings, Fig. 1 is a plan of a machine embodying my invention; Fig. 2 is a vertical cross section indicated by the lines 2—2 in Fig. 1; Fig. 3 is a cross section indicated by the lines 3—3 in Fig. 2; Fig. 4 is a vertical cross section through the trimming and perforating press indicated by lines 4—4 in Fig. 2; Figs. 5 and 6 are cross sections illustrating the perforating mechanism indicated by lines 5—5 and 6—6 in Fig. 2; Fig. 7 is a side elevation, partially broken away, of the driving, splitting and stacking mechanism looking from the left hand side of Fig. 1; Fig. 8 is a vertical cross section indicated by the offset lines 8—8 in Fig. 2; Fig. 9 is a side elevation of a cam mechanism which controls the stacking mechanism; Fig. 10 is a vertical cross section indicated by the lines 10—10 in Fig. 1; Fig. 11 is a cross section showing the parts illustrated in Fig. 10, but in a different position; Fig. 12 is a vertical cross section indicated by the offset lines 12—12 in Fig. 10. Fig. 13 is a horizontal cross section indicated by the lines 13—13 in Fig. 12. Fig. 14 is a vertical cross section indicated by the lines 14—14 in Fig. 1 illustrating the aligning mechanism. Fig. 15 is a vertical cross section indicated by the lines 15—15 in Fig. 1 illustrating the clamping mechanism. Fig. 16 is a vertical cross section indicated by the lines 16—16 in Fig. 1. Fig. 17 is a horizontal cross section indicated by the lines 17—17 in Fig. 14. Fig. 18 is a cross section indicated by the lines 18—18 in Fig. 17. Fig. 19 is a side elevation looking from the bottom of Fig. 1, illustrating the wire feeding mechanism certain parts being broken away. Fig. 20 is a vertical cross section indicated by the lines 20—20 in Fig. 19. Fig. 21 is a vertical cross section indicated by the lines 21—21 in Fig. 19. Fig. 22 is a vertical cross section indicated by the lines 22—22 in Fig. 21. Fig. 23 is a horizontal cross section indicated by the lines 23—23 in Fig. 22. Fig. 24 is a vertical cross section indicated by the offset lines 24—24 in Fig. 7. Fig. 25 is a horizontal cross section indicated by the lines 25—25 in Fig. 7. Fig. 26 is a perspective of the counting mechanism. Figs. 27 to 34 inclusive, are diagrammatic illustrations of the work in different stages of progress through the apparatus. Fig. 35 is a perspective of a completed bundle of shingles. Figs. 36 and 37 illustrate different forms of product for which my machine is used.

My invention contemplates provision of a machine adaptable for the formation of shingles made from composition sheet material, such for example as asbestos board. Shingles formed of the latter material may have various shapes and may be perforated in the course of manufacture whereby the shingle units when ultimately used may be attached to the building construction by suitable securing means which extend through the perforations. In the present form of my invention I provide a chain of coordinated mechanisms which can be utilized to effect the cutting of sheets of material into product units, or if desired, shingle units of approximate dimension may be passed through the apparatus to be properly sized, perforated and bundled. The present apparatus is adaptable to the finishing of composition shingles of various shapes and sizes.

In the drawings, the cutting, perforating and trimming mechanism is generally indicated at 10; the mechanism for conveying sheets to the cutting and trimming mechanism is generally indicated at 15; the splitting and separating mechanism is generally indicated at 18; and the bundling mechanism is generally indicated at 20.

I will now describe the mechanism used to trim, perforate and cut the shingles as shown by Figs. 1—2—3—4—5 and 6. This mechanism or press consists of upright frame members 21 carrying a bed member 22 and suitable cross members 23. Journalled in the frame members 21 is a crank shaft 24 having crank arms 27. The shaft 24 carries a pulley 25 and may be driven by any suitable source of power, such as by means of a belt 26 and a motor not shown. Mounted on the crank arms 27 is an operating head 30 which is reciprocated in an up and down movement by the rotation of the crank arms 27 and the shaft 24. This head is guided by means of stationary plungers 31 which are rigidly mounted in the base 22 and register with cylindrical openings 32 in the head 30 as shown in Fig. 4.

Secured to the head 30 by means of bolts 36 is a die block 40 which carries shear members 45 and punch members 55 (see Figs. 5 and 6). The shear or trimming members 45 are adjustably mounted on the die block by means of bolts 46 passing through slots 47 in the shear. Adjusting screws 48 mounted in ears 49 projecting from the die block 40 are used to maintain accurate adjustment of the shears. If desired the shear may consist of a holder 45a which carried a knife 45b so as to facilitate replacement of the cutting edges.

An ejector plate 50 is mounted below the die block 40 in the area surrounded by the shears 45 and is secured by means of bolts 51 passing through the head 40. The ejector plate is normally forced downwardly by springs 42 mounted in recesses in the head 40. This movement is limited by means of adjusting nuts 53 on the bolts 51 which contact with the upper surfaces of the head 40. This ejects any material which has a tendency to remain gripped by the inner surface of the shears.

The punch members 55 may be mounted in the head 40 in any suitable manner. As illustrated in Figs. 2 and 5 the head 40 is provided with a T-shaped slot 56 in which a T-shaped block 57 may be secured in any suitable manner. Pressed in the block 57 are guide members 58 which guide the punch 55. A headed portion 60 of the punch 55 seats in the uppermost end of the guide member 57 and is held in contact therewith by means of a threaded member 61 carried by the block 57. This method of positioning the punch members permits them to be changed from one position to another in the slot without altering the die head 40. Another method of mounting the punch is shown in Fig. 6. Here the guide member 58 is pressed directly into the head 50 while the headed portion 60 of the punch is held in a screw plug 63 by means of a member 64 threaded in the plug. As the plug 63 is threaded directly into the die block 40 the punch may be adjusted vertically with ease and any particular punch be raised so as to prevent its coming into contact with the slab or work. The ejector plate 50 is provided with openings 65 so that it may operate clear of the punches.

Mounted on the bed 22 of the press is a stationary plate 67 the edges of which coact with the shear, and has openings 68 which coact with the punch members 55 to form the slab or shingle to proper size and make desired perforations.

The mechanism 15 which feeds the unformed material W to the trimming and perforating mechanism consists of a table member 70 supported by the punch frame 21 and extending to the rear thereof (see Figs. 1, 2 and 3). Mounted on this table is a magazine for replacing slabs consisting of upright members 71 and suitable cross members 72 which retain the stack of material. The members 71 and 72 are cut away at their lowermost ends as at 73 to permit one piece of work W to be pushed from under the stack while the remaining slabs are retained therein.

To propel the sheet forwardly (to the left in Fig. 2) the table 70 is provided with a slideway 74 in which a carriage 75 is reciprocated by means to be hereinafter described.

Mounted on this carriage and riding on the table 70 is a plate 77 slightly less in thickness than one sheet of material. As this plate is reciprocated it pushes the bottommost sheet from the stack and carries it into position under the die head 40. The balance of the stack is supported by the plate 77, and upon the return stroke (to the right in Fig. 3) of the carriage the plate 77 is withdrawn from beneath the stack, permitting the latter to drop to the table, and the plate 77 is then in position to carry the next sheet forward.

While the feeding mechanism shown feeds the bottommost sheet it is contemplated that the uppermost sheet could easily be fed by the reciprocating movement and it is further contemplated that the reciprocating movement could be utilized to feed material from a roll as easily as to feed separate sheets from a stack.

At the forward end of the press I mount a splitting and separating mechanism which scores and breaks apart the sheet, much in the same manner as one would cut a pane of glass. I find this novel method most advantageous in that it permits the material to be fed to the press in sizes sufficiently large to be cut into two formed sheets. If a single action press is used thereby simplifying the mechanism, a strip of material would either have to be sacrificed or the severed edges of the sheet would be uneven and burred. However, by forming shingles in the press and later splitting them I prevent waste, and secure a uniform product.

Mounted at the forward end of the press is a splitting and stacking mechanism 18. This is comprised of side frame members 80 and 81 with suitable cross members 82. As a sheet W is fed to the press by the plate 77 it carries the sheet which has just been formed and punched by the press forward into the bite of the feed rollers 85, rigidly mounted on shafts 87 carried by the frame members 80a and 81a of the splitting and stacking mechanism. These rolls pick up the sheet and feed it (to the left Fig. 2) into the bite of the scoring knives 88 (see Figs. 2 and 8) rigidly mounted on shafts 89 mounted in frame members 80a and 81a. These knives score the sheet on both top and bottom sides and deliver it to a set of feed rollers 90 mounted on shafts 91 supported by the side frames 80a and 81a. This latter set of feed rolls deliver the scored sheet onto the belt conveyor which will be hereinafter more fully described. I find it convenient to provide for vertical adjustment of the series of rolls in order that different weights of materials may be used, hence each of the shafts 87, 89 and 91 are journalled in adjustable blocks 86 adjustably mounted in the frames 80a and 81a by means of adjusting screws 86a.

I will now describe the driving mechanism which propels the reciprocating feed 15 and the splitting mechanism 18. Keyed on the crank shaft 24 of the press is a sprocket 100 which, through the chain 101, drives the pulley 102 keyed to the crank shaft 103, Figs. 2, 4 and 7. Journalled on the crank arm 104 of the shaft 103 is a connecting rod 105 which is connected by a wrist pin 108 to a segmental gear 107 loosely mounted on a shaft 106 journalled in the frame members 80 and 81.

This imparts reciprocatory movement to the segmental gear 107. Mounted in the slideway 109 in the frame member 82 is a slide bar 110 which carries a rack 111 coacting with the segmental gear 107. This slidebar extends rearwardly beneath the press 10 and is fastened to the carriage 75 by means of a threaded portion 112 of the bar and clamping nuts 113. As the ratio of the gear 100 to the gear 102 is one to one, it will be seen that this slide bar will cause the carriage 75 to reciprocate once for each revolution of the press 10. This movement is timed so that when the press is in an inactive portion of its movement the carriage is progressed forward to feed a sheet and has partially withdrawn before the press enters on the active portion of its stroke. It is therefore apparent that a piece of work will be fed and formed for each revolution of the crank shaft of the press.

Keyed to each of the shafts 87 are spur gears 115 which mesh with each other so that they are driven at the same speed. The roller shafts 91 are likewise geared together by similar gears 116 while the cutter shafts 89 are similarly geared together by means of spur gears 117.

Keyed to the lowermost of each pair of shafts 87, 89 and 91 are sprockets 118 which are driven by a chain 119 meshing with a sprocket 120 mounted on the shaft 103. The gearing is such that the feed rolls are driven at a peripheral speed that progress the work faster than the travel of the feeding mechanism 15. In order that a maximum amount of driving contact may be had between the chain 119 and the sprockets 118 I provide idler sprockets 121 which are journalled on studs mounted in the frame member 81a.

To split and separate the scored sheets so that they may be stacked for bundling, I provide the following mechanism.

Mounted on the frame member 82 are bearings 125 which carry shafts 126. Rigidly mounted on the shafts 126 are rollers 127 which carry conveyor belts 128 adapted to convey the sheets as they are discharged by the feed rolls 70. While the sheet is on these conveyor belts its progress is arrested and it is split and separated as is hereinafter described.

Rigidly mounted on the shaft 103 is a cam 130 (Figs 1, 7 and 8) which coacts with a roller 131 on the lower end of a lever 132 pivoted to the frame 80 at 133. The upper end of the lever 132 is connected to a cam bar 135 by means of a link 136. The cam bar 135 is slidably mounted on the frame member 82 by means of bearings 137. A rock shaft 138 is mounted on the frame member 82 in bearings 139. Rigidly carried by this shaft 138 are stop fingers 140 which lie between the conveyor belts 128 and are adapted to lie normally in a plane below that of the scored sheet and upon a rocking of the shaft are brought upward in such manner as to arrest the progress of the sheet.

The splitting mechanism consists of a bell crank with arms 142 and 144 rigidly mounted on the rock shaft 138. The arm 142 coacts with collars 143 pinned to the cam bar 135 which thereby imparts a rocking motion to the shaft 138. A spring pressed plunger 145 coacts with the beveled arm 144 of the bell crank to keep the latter in contact with one of the collars 143 as well as to expedite the movement of the rock arms 140.

The mechanism which is used to split the sheet consists of a bar 147 pivotally mounted on a rock arm 148 which is rotatably mounted on a shaft 149 carried by bearings 150 on the frame member 82. Rigidly connected with the shaft 149 is a lever 153 which carries a roller 154 coacting with a cam 155 which is pinned to the cam bar 135. This mechanism imparts a sharp blow to the sheet thereby causing it to split along the score. To prevent upward movement of the sheet I provide bars 157 which overlie the sheet along its edges and prevent excessive upward movement of the sheet.

After the splitting operation has been completed the stop fingers 140 are withdrawn permitting the sheet to be carried forward by the conveyor 128 where the split members of the sheet are divided by means of a V shaped dividing plate 158. (Figs. 1 and 7).

The product then is carried by the conveyor 128 and discharged in a trough shaped member 160. The member 160 then acts to stack the units on end and carry them forward to two respective positions on a conveyor 180 of the bundling mechanism. The trough shaped member 160 is supported by a plunger 161 having a pin and slot connection therewith at 163—162 and by a link 165. The plunger 161 is mounted in a carriage 166. A spring 167 acts at all times to draw the plunger rearwardly pulling the trough member 160 into contact with an arm 168 rotatably mounted on a shaft 169 carried by the frame 82. The link 165 is pinned to a collar 170 rigidly secured to the carriage 166. The carriage 166 is mounted in a frame 175 which is slidably mounted on the frame member 82. The collar 170 is resiliently connected to the frame member 175 by means of bolts 176 and compression springs 177 (Fig. 13) which act to hold the collar in contact with the frame.

The frame 175 is connected by means of a link 178 to a lever 179 which is in turn connected to the rock shaft 181. A lever 182 keyed to the rock shaft 181 tends to rock the shaft and draw the frame forward. As the frame is drawn forward, the compression spring 167 retains the plunger 161 in its rearmost position while the collar 170 is drawn forward by the link 165 thus putting the trough shaped member 160 in an upright or vertical position as shown in Fig. 11.

At this time the carriage 166 coacts with the shoulder 161a of the plunger 161 and carries it forward in unison with the link 165 thereby bringing the trough shaped member forward in a vertical position. The product rests on a lip 168a of the arm 168, and as the trough 160 is progressed forward the product is pushed from the lip 168a onto the conveyor of the bundling mechanism.

The member 160 is reciprocated by means of a bar 187, to be presently described, and the bar is adjustably connected to the rock shaft 181 by means of a yoke 183 which carries a slide block 184, this being connected to the bar 187 by a fork 185. The slide block 184 is adjustably positioned in the yoke 183 by means of a screw 186. The bar 187 extends rearwardly and is connected to a Scotch yoke 188 which rides on a slide block 189 carried by the shaft 103. The yoke 188 carries a roller 190 which contacts with a cam 191 rigidly secured to the shaft 103, thereby imparting a rocking motion to the trough 160 once for each cycle of the operation of the cutting apparatus.

The counting mechanism which controls a single action clutch used to set the bundling mechanism in operation will now be described. As the product is carried forward by the trough 160 it contacts with an arm 200 secured to a shaft 201. The shaft 201 is prevented from rotation by means of a pawl 202 coacting with a cam portion 203 of the arm 200 and is thereby rocked forwardly (to the right, in Fig. 26). The shaft 201 is pivotally mounted on a block 204 secured to the frame member 82.

As the shaft is rocked forward by cooperation of the product with the arm 200, a link 205 rocks a lever arm 206 carrying with it a pawl 207 which advances a ratchet 208 mounted on a shaft 209 journaled on the frame member 210. The ratchet 208 carries a cam 211 which coacts with an arm 212 which operates an electric switch 215. As the cam 211 operates to rotate the arm 212 the switch 215 is thrown into an "on" position thereby energizing a solenoid to be hereinafter described. The lever 212 by means of a spring 213 normally holds the switch 215 in an "off" position.

After the shaft 201 has acted to advance the ratchet one notch, a lip 216 of the pawl 202 is engaged by a lug or screw 217 thereby permitting the pawl to free the arm 200 which permits the latter to rotate until it has cleared the product. The rod 201 and the pawl 202 are journaled on a plate or carriage 217a. Springs 219 and 220 tend to return the pawl 202 and the arm 200, respectively, to their normal positions. Pivotally secured to the plate 217a is a plunger 221 which slides in a tubular member 222 which is pivotally mounted on a block 222a supported by the frame 82. A spring 223 acts to return the plate 217a and its associated mechanism to a normal position after the product has passed free of the arm 200.

It will be noted that while the shaft 201 is in the active portion of its movement, namely, while it is progressing the ratchet, the arm 200 is in parallel relationship to the product, and it is not until the shaft 201 has completed the active portion of its movement that the arm 200 is permitted to rock. This prevents marring or mutilation of the product by the counter mechanism.

The mechanism which controls the operation of the bundling apparatus will now be described. Keyed to the shaft 103 is a sprocket 230 which carries a chain 231 coacting with a sprocket 232 rigidly mounted on a sleeve or clutch member 233 which is loosely mounted on the shaft 106. The clutch member 233 coacts with a plunger 234 normally held disengaged from the clutch member 233 by an arm 235 pivotally mounted on the frame member 82 at 226. A spring 227 normally holds the arm 235 in engagement with the plunger 234 holding it against movement. The plunger 233 is carried in a rotor 237a keyed to the shaft 106 thereby causing the plunger 234 to coact with the clutch 233 once for each revolution of the sprocket 232. Normally the arm 235 cams this plunger inwardly preventing its cooperation with the clutch 233 thus preventing a driving connection between the sprocket 232 and the shaft 106.

The arm 235 carries a pin 236 which coacts with a pawl 237 mounted on one arm of a bell crank 238 carried by a bracket 239 of the frame member 80. The bell crank 238 has another arm 240 which is connected by means of a link 241 to a solenoid 250. When the solenoid 250 is energized by the switch 215 of the counting mechanism it rocks the arm 240 in a counter clock wise direction (see Fig. 7), thereby causing the pawl 237 to act on the pin 236 and withdraw the arm 235, permitting the plunger 234 to contact with the clutch member 233 thus imparting a rotating movement to the rotor 237a and likewise the shaft 106.

When the solenoid 250 is energized by the switch 215 of the counting mechanism, it is almost instantly de-energized, and it will be seen that the bell crank 238 will return to normal position almost instantly thereby permitting the spring 227 to pull the arm 235 in position to cam the plunger 234 out of contact with the sprocket 232 when the latter has completed one revolution.

Rigidly secured to the shaft 106 is a sprocket 275, which through a chain 276 drives a sprocket 277 keyed to the shaft 278 of the bundling mechanism. The shaft 278 rotates once for every three revolutions of the cutting mechanism driving shaft 24.

The product is now upended in two stacks on the conveyor 180 each stack having the required number of the product for a bundle. The conveyor 180 now progresses the two stacks into position for the aligning mechanism to operate on them. The conveyor 180 is mounted on sprocket wheels 296 and 296a carried by shafts 294 and 294a mounted in suitable bearings 295 on the frame 291 of the bundling mechanism. The shaft 294 carries a bevel pinion 293 meshing with a bevel gear 292 loosely mounted on a shaft 283 journaled in bearings 290 mounted on the frame member 291. Rigidly secured to the bevel gear 292 is a Geneva wheel 282 which is acted upon by a roller 281 mounted on the driving wheel 280 which is rigidly secured to the drive shaft 278. This imparts a movement to the conveyor 180 during the first quarter of the revolution of the shaft 278 and permits the conveyor to be idle until a subsequent rotation of the shaft 278.

As the shaft 278 rotates once to every three revolutions of the press, and as the conveyor 180 advances the stacks during the first quarter of the revolution of the shaft 278, it is apparent that the conveyor 180 has advanced the stacks of the product before the mechanism 160 is in position to discharge another piece of work onto the conveyor 180. The product is now in two stacks in position for the aligning mechanism to act. This mechanism consists of plungers 300 and 301. The plunger 301 is inserted between the two stacks while the plungers 300 are brought into position on the outer sides of the two stacks. Bars 303 (Fig. 17) pivoted in the plungers 300 at 304 and normally held in slots 305 in the plungers by springs 306 are now brought sharply against the edges of each stack forcing the product against the plungers 301 thereby aligning the perforations in the product horizontally. The alignment vertically is taken care of by gravitation, each stack resting on the conveyor or chain 180 which is at this point supported by bars 307 rigidly secured to the frame members 308, as shown in Fig. 14.

These plungers 300 and 301 are slidably mounted in the frame members 302 of the building mechanism. Pinned to the plunger 301 is a spider 310 which, on the forward or active stroke (to the left in Fig. 14) of the plungers, acts through compression springs 311 and collars 312, pinned to the plungers 300, to bring the latter forward slightly after the plunger 301. As the plungers 300 are carried forward, carrying with them the bars 303, ears 314 of the bars 303 coact with the stationary frame member 302 to bring the bars 303 inward with a sharp blow. Rigidly secured to the bar 301 is a collar 315 connected by a link 316 to a lever 317 pivotally mounted to the frame at 318.

The lever 317 carries a roller 319 which coacts with a cam wheel 320 keyed to the shaft 278. This cam is so constructed as to keep the plungers 300 and 301 in an inactive position out of the path of the product during the progression of the product by the conveyor 180 and then rapidly brings the plungers into operation and keeps them so until the wire or binder has been fed to the perforations and then returns the plungers just before the Geneva motion 282 is in position to again progress the conveyor mechanism as heretofore described.

While the stacks of work are held between the bars 303 and the frame member 302, the wire feeding mechanism is brought into operation to feed wire to the perforations, previously made in the product by the punchers 55, and now aligned in the stack. This mechanism is shown in Figs. 19, 20, 21, 22 and 23. Wire B may be carried on reels or other suitable means, not shown, and feed between straightening rolls 320 carried by brackets 321 secured by bolts 322 to bars 323. These bars are carried by cross bars 324 mounted on the upright frame members 308. The wire is then gripped by feed rolls 325 which feed a predetermined length of wire through guides 326 which are in alignment with the perforations 327 in the product.

Each upper feed roll 325 is mounted in a yoke 328 which is pivoted to the bracket 321 at 329 and pressed in contact with the lower feed roll by means of a compression spring 330. Adjusting nuts 331 limit the pressure of the upper feed roll 325 against the lower feed roll. The upper feed roll has a portion of its periphery cut away as at 332. When this position is adjacent the lower feed roll it is out of contact with the wire.

During the interval of time in which the upper feed roll is out of contact with the wire a shear 334 operates to cut the wire. The shear bears against the guide 326 mounted on a block 335 which slides in a dove tailed slot 336 in the bracket member 321. The block 335 is normally held against the block 337 in the upper part of the slideway by means of a compression spring 338. A pin 339 carried by the block 335 coacts with a forked lever 340 pivoted to the bracket 321 at 341 to raise the block 335 and with it the shear 334 thereby cutting the wire between the shear and the guide block 326.

The lever 340 is operated by a pin 342 carried by the upper feed roll 325. As shown in Fig. 19 there are four sets of wire feed rolls and associated mechanisms, two of which act on each stack of shingles. It will be noted that these wire feeding mechanisms are secured to the bars 323 by means of bolts 323a. It will also be noted that the bars 323 are secured to bars 324 by means of bolts 324a.

As shown in Fig. 19 threaded openings 344 are provided in the bars 323 and 324 so that the feeding mechanisms may be vertically adjusted on the bars 323 as well as horizontally adjusted by changing the position of the location of the bars 323 on the bars 324. It will also be noted that any of the wire feeding mechanisms may be entirely omitted as desired. Thus it is seen that wire may be fed to the perforations in any of the types of shingles illustrated in Figs. 35, 36 or 37, as well as any other type desired.

The wire feed rolls 325 are geared together by spur gears 346. Each lower feed roll is driven by a spiral gear 347 meshing with a spiral gear 348 keyed to a splined shaft 345 mounted in the bracket 321. Splined to the shaft 345 is a spiral gear 349 journalled in a housing 350 mounted on the cross shaft 351. A spiral gear 352 splined to the cross shaft 351 is likewise journalled in the housing 350 and meshes with the gear 349. The cross shaft 351 is journalled on suitable bearings mounted on the frame 291 and is driven by a bevel gear 352, keyed to the shaft 351, meshing with a bevel gear 353. The gear 353 is mounted on a jack shaft 354 on one end of which is a bevel pinion 355 which meshes with a bevel gear 356 freely rotatably mounted on the shaft 283. Rigidly mounted on the bevel gear 356 is a Geneva wheel 357 which is driven by a drive roller 358 mounted on a drive wheel 359 keyed to the drive shaft 278. This mechanism is so timed as to make a driving connection with the wire feed mechanism immediately after the stacks have been aligned and to complete its operation within one quarter of a revolution of the drive shaft 278.

Figure 34:
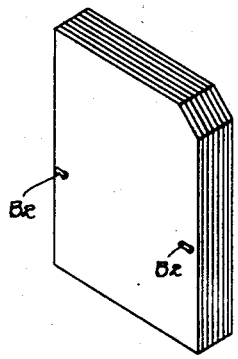

At the beginning of the next subsequent revolution of the drive shaft 278 the conveyor 180 again progresses one step as heretofore described. The conveyor 180 has lugs 180a which now positively carry the stacks P3 from the aligning position and cause the ends of the cut wires B' to be bent against the bundle by means of slotted plates 365a carried by the upright bars 323. The conveyor now advances the two stacks carrying in the perforations thereof a length of wire to a final bundling position as indicated at P4. Here the wired stack is pressed and the ends B2 of the wire clamped against the bundle as shown in Figs. 34 and 35.

To accomplish this pressing I provide a spider 360 which carries bars 361 so arranged as to press the wire W2 against the bars 362 and clamp the bundles against the bars 344. The spider 360 is forced against the bundle by means of a shaft 363 rigidly secured to the plunger and slidably mounted on the frame brackets 364. A guide rod 363a carried by the spider 360 and slidably mounted in the frame bracket 364 keeps the spider parallel to the stack. Rigidly secured to the shaft 363 is a collar 365 which is adjustably connected by means of the adjusting screw 366 to a collar 367 slidably mounted on the shaft 363. The adjusting screw 366 is slidably mounted in the rear frame member 364 and its forward movement is limited by adjusting units 366a contacting with the frame member. A plunger 368 is mounted in the collar 367 and held in position against the collar by means of compression spring 369. A link 370 connects the plunger 368 to a lever 371 pivoted to the frame member 291. The lever 371 carries a roller 372 which coacts with a cam wheel 373 rigid on the drive shaft 278 which acts to impart a reciprocating movement to the spider 360. A spring 374 acts on the lever 371 to maintain a contact between the cam 373 and the roller 372. This cam is so arranged as to drive the spider against the bundles during the second and third quarters of the revolution of the shaft 278. The bundle is now complete and the next subsequent rotation of the shaft 278 will discharge the bundle from the machine.

The shingles illustrated in Figs. 36 and 37 are of such size that the splitting mechanism 18 is not required. In this case the scoring knives 88 are withdrawn from contact with the work by means of the adjusting screws 86a thereby rendering them inoperative. The lever 132 is then removed in order that the stop fingers 140, the splitting bar 147 and associated mechanisms will remain inoperative. The separator bar 158 is also removed permitting the work to travel on the conveyor 128 uninterrupted and without mutilation. The lugs 180a of the conveyor 180 of the bundling mechanism are then set to accommodate the specific size of shingle to be bundled. The plunger 301 is then withdrawn and the spider 310 and the collar 315 are adjusted in such a manner as to prevent the plunger 301 from coming into contact with the shingle. The wire feeding units are then adjusted in a manner heretofore described so as to pass wire through the openings in the specific size shingle being bundled. Thus it is seen that a great variation of shapes of shingles are capable of being handled in this machine.

Figure 27:
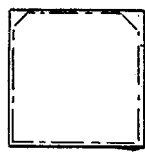
Figure 28:
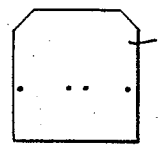

It will be seen from the foregoing description and the drawings that I have provided an apparatus adapted to take slab material such as may comprise asbestos board as diagrammaticlly illustrated as W in Fig. 27 and feed it to a trimming and perforating mechanism, the result of which operation is illustrated as W' in Fig. 28. The work is then progressed through a scoring mechanism which, like the feeding mechanism, is driven from the press and in timed relation with it. The result of this operation on the work is illustrated as W2 in Fig. 29. The work is then cracked or broken apart and separated into units as illustrated by W3 in Fig. 30. A stacking apparatus then operates to stack the units on end in separate stacks containing a predetermined number of units as illustrated at P2 in Fig. 31. The stacks illustrated in Figs. 31, 32 and 34 as P2, P3, and P5 are then simultaneously progressed (at right angles to the original path of travel) by the conveyor mechanism. The stack indicated in Fig. 32 had been aligned, and wire had been fed to the perforations therein on the last previous complete cycle of operation of the bundling mechanism and as it leaves the position indicated in Fig. 32 the ends of the wire are bent as indicated by P4 in Fig. 33. While the wire was being fed to the stack at P3 the wired stacks indicated by P5 were being pressed and the wire clamped against the bundle as indicated by P4 in Figs. 34 and 35. This bundle is now complete and is discharged from the machine.

I claim:

1. In a machine of the character described, the combination of a reciprocating mechanism for perforating a slab of material to be divided into a plurality of finished units, means for effecting such division of the slab, a unit receiver associated with the last named means for assembling a predetermined number of the units in bundle relation including a counting mechanism, and means for effecting the bundling of the units, said last named means controlled for operation by the counting mechanism.

2. In a machine of the character described, the combination of mechanism for perforating a slab of material, a slab receiving means associated with the perforating mechanism and means adapted to assemble a predetermined number of the perforated slabs in bundle relation including a counting mechanism, and means for effecting the bundling of the slabs, said last-named means controlled for effective operation by said counting mechanism.

3. In a machine of the character described, the combination with feeding means, of a mechanism adapted to trim and perforate a slab of material, and a slab guiding means for guiding the trimmed sections from such mechanism to means adapted to assemble the slabs with the perforations thereof in alignment, and means for binding the slabs into bundles by passing the binding means through said perforations.

4. In a machine of the character described, the combination of a mechanism adapted to trim and perforate slabs of material, a slab guiding means for guiding the trimmed sections from such mechanism to means adapted to assemble the slabs with the perforations thereof in alignment, a counting mechanism associated with the guiding mechanism, and means for binding the slabs into bundles by passing the binding means through said perforations, said last named means controlled for effective operation by the counting mechanism.

5. In a machine of the character described, the combination of a mechanism adapted to perforate slabs of material one at a time, guiding means to guide the perforated slabs from such mechanism to means adapted to assemble a plurality of perforated slabs with the perforations thereof in alignment, and means for binding the slabs into bundles by passing the binding means through said perforations.

6. In a machine of the character described, the combination with feeding means, of a mechanism adapted to trim and perforate slabs of material, means for dividing the slabs into product units, guiding means for guiding the divided slabs from such mechanism to means adapted to assemble the units with the perforations thereof in alignment, and means for binding the units into bundles by passing the binding means through said perforations.

7. In a machine of the character described, the combination of means for effecting perforations in a slab of material, means for dividing the slab into product units, a unit receiver associated with said last-named means and means for assembling the perforated units into stacks of uniform size with the perforations thereof aligned, a counting mechanism associated with such assembling means, and means for effecting the binding or bundling of the units by passing the binding means through said perforations, said last-named means adapted to be set in effective motion by said counting mechanism.

8. In a machine of the character described, the combination of means for effecting perforations in a slab of material, while trimming the slab, means for dividing the slab into units, means for assembling the perforated units into stacks with the perforations thereof aligned, a counting mechanism associated with such assembling means, and means for effecting the binding or bundling of the units by passing the binding means through said perforations, said last-named means controlled for effective operation by said counting mechanism.

9. In a machine of the character described, the combination of means for effecting perforations in a slab of material, a slab guiding means for guiding the perforated slab from such perforating means to means for assembling the perforated slab in stacks of uniform size with the perforations thereof aligned, and means for effecting the binding or bundling of the slabs by passing the binding means through said perforations.

10. In a machine of the character described, the combination of means for perforating trimming and dividing slabs of material, into units of uniform dimensions, means for assembling the units simultaneously into a plurality of stacks, a counting mechanism associated with such assembling means, and means for effecting the binding or bundling of the units, said last named means controlled by said counting mechanism for effective operation.

11. An apparatus of the character described, having in combination a reciprocating means for trimming and perforating a slab of material, means for feeding slabs of material thereto, mechanism associated with said reciprocating means for dividing the slabs into a plurality of product units, and a slab guiding means for guiding the divided slabs from such mechanism to a mechanism associated with said aforesaid mechanism for effecting the assembling and binding of the units into bundles of uniform content, and a counting mechanism associated with said slab guiding means adapted to control the effective operation of the assembling and bundling mechanism.

12. In a machine of the character described, the combination with sheet feeding means, means adapted to stack a predetermined number of perforated sheets, means adapted to align the stack of perforated sheets, and a wire feeding mechanism adapted to wire the stack into a permanent bundle formation by passing the wire through said perforations.

13. In a machine of the character described, the combination with sheet feeding means, means adapted to stack a predetermined number of perforated sheets, means adapted to deck the stack of sheets with the perforations thereof in alignment, and a wire feeding mechanism adapted to wire the stack into a permanent bundle formation by passing the wire through said perforations.

14. In a machine of the character described, the combination with sheet feeding means, means adapted to stack a predetermined number of perforated sheets, means adapted to align the stack of perforated sheets, wire feeding mechanism adapted to wire the stack into a permanent bundle formation by passing wire through said perforations, and wire shearing and binding means for causing the wire to engage only opposite faces of the bundle.

15. In a machine of the character described, the combination of sheet feeding means with shearing mechanism adapted to trim the sheets to a predetermined size, subsequently acting means adapted to split each sheet, conveying mechanism adapted to carry and stack the units thus obtained, a counting mechanism associated with the conveying mechanism, and mechanism adapted to wire each stack of units in bundle formation, said mechanism controlled for effective operation by said counting mechanism.

16. In a machine of the character described, the combination of sheet feeding means with shearing mechanism adapted to shear the sheets to a predetermined size, a sheet scoring and breaking means adapted to split each sheet, guiding means to guide the split sheets from the breaking means to a conveying mechanism adapted to carry and stack the units thus obtained, means associated with said guiding means for predetermining the number of units in each stack, and mechanism adapted to wire each stack of sheets in bundle formation, said last named mechanism controlled by the counting mechanism.

17. In a machine of the character described, the combination of sheet feeding means with shearing mechanism adapted to shear the sheets to a predetermined size, means adapted to split each sheet into units, said feeding means being effected to move a trimmed sheet from the shearing mechanism to the sheet splitting means, a counting mechanism associated with said feeding means, conveying mechanism adapted to carry and stack the units thus obtained, and mechanism adapted to wire each stack of units in bundle formation, said conveyor controlled for operation by the counting mechanism.

18. In a machine of the character described, the combination of means adapted to stack perforated sheets in predetermined quantities, means intermittently driven adapted to progress the stack, and wire feeding mechanism adapted to wire the stack into bundle formation by passing the wire through said perforations.

19. In a machine of the character described, the combination of feeding mechanism adapted to feed sheets with perforations, means adapted to stack the perforated sheets in predetermined quantities, intermittently driven means adapted to align said perforated sheet, means adapted to progress the stack, and a wire feeding mechanism adapted to wire the stack into bundle formation by passing the wire through said perforations.

20. In a machine of the character described, the combination with a periodically operating press adapted to trim and perforate sheets, a feeding mechanism controlled by the press and adapted to feed sheets from a stack to the press, means adapted to receive a predetermined number of finished sheets, and a normally inactive wire feeding mechanism controlled for effective operation by the press adapted to bind the sheets in bundle formation by passing the binding means through said perforations.

21. In a machine of the character described, the combination of a periodically operating press adapted to form sheets, a feeding mechanism controlled by the press and adapted to feed sheets to the press, means adapted to stack a predetermined number of finished sheets, counting mechanism associated with the stacking mechanism, and normally inactive wire feeding mechanism controlled for operation by the press and adapted to bind the stack of finished sheets in bundle formation.

22. In a machine of the character described, the combination of a periodically operating press adapted to form sheets, a feeding means controlled by the press, means adapted to stack the sheets, counting mechanism associated with said stacking means adapted to progress the stack when it contains a predetermined number of sheets, and a normally inactive wire feeding mechanism controlled for effective feeding by the counting mechanism and adapted to bind the stack of finished sheets in bundle formation.

23. An apparatus of the character described, having in combination means for perforating a slab of material, means for dividing the perforated slab into a plurality of product units, some units varying in form from others, means to stack the divided units into stacks, each stack containing a predetermined number of units of the same form, means to align the perforations in each stack, and means for binding the stacks into bundles by passing the binding means through said perforations.

24. An apparatus of the class described having in combination means for perforating a slab of material, means for dividing the slab into a plurality of product units wherein the location of the perforations in one unit may vary from the location of the perforations in another unit, means to assemble the units in stacks, each stack containing a predetermined number of units having their perforations located identically, and means to bind the stacks into bundles by passing the binding means through said perforations.

In testimony whereof, I hereunto affix my signature.

THEODORE H. EICKHOFF.